US009934576B2

(12) United States Patent
Konishi

(10) Patent No.: US 9,934,576 B2
(45) Date of Patent: Apr. 3, 2018

(54) IMAGE PROCESSING SYSTEM, IMAGE PROCESSING METHOD, AND RECORDING MEDIUM

(71) Applicant: NEC Corporation, Tokyo (JP)

(72) Inventor: Yusuke Konishi, Tokyo (JP)

(73) Assignee: NEC Corporation, Tokyo (JP)

( * ) Notice: Subject to any disclaimer, the term of this patent is extended or adjusted under 35 U.S.C. 154(b) by 75 days.

(21) Appl. No.: 14/915,109

(22) PCT Filed: Jul. 2, 2014

(86) PCT No.: PCT/JP2014/067693
§ 371 (c)(1),
(2) Date: Feb. 26, 2016

(87) PCT Pub. No.: WO2015/029588
PCT Pub. Date: Mar. 5, 2015

(65) Prior Publication Data
US 2016/0210756 A1 Jul. 21, 2016

(30) Foreign Application Priority Data

Aug. 27, 2013 (JP) ................. 2013-176082

(51) Int. Cl.
G06K 9/00 (2006.01)
G06T 7/00 (2017.01)
(Continued)

(52) U.S. Cl.
CPC ........ *G06T 7/0081* (2013.01); *G06K 9/00778* (2013.01); *G06T 7/11* (2017.01);
(Continued)

(58) Field of Classification Search
CPC ......... G06T 7/0081; G06T 7/194; G06T 7/11; G06T 7/20; G06T 2207/30196; G06T 2207/30242; G06K 9/00778
See application file for complete search history.

(56) References Cited

U.S. PATENT DOCUMENTS 8,472,715 B2 * 6/2013 Yokomitsu .............. B61L 23/00
382/103
8,655,078 B2 * 2/2014 Yokomitsu .............. B61L 23/00
382/170

FOREIGN PATENT DOCUMENTS

JP 2008-217184 9/2008
JP 2009-110152 5/2009
(Continued)

OTHER PUBLICATIONS

International Search Report and Written Opinion dated Aug. 12, 2014 in corresponding PCT International Application.

*Primary Examiner* — Shefali Goradia
(74) *Attorney, Agent, or Firm* — Finnegan, Henderson, Farabow, Garrett & Dunner, L.L.P.

(57) ABSTRACT

An image processing system includes: a background-image generation unit configured to generate an background image based on input images captured at a plurality of times; a static-area determination unit configured to detect a continued-presence area in a partial area in which an image of a plurality of persons possibly exists in an input image, based on a difference between a first background image generated based on input images captured within a first time width from a processing time and a second background image generated based on input images captured within a second time width from the processing time; a person detection unit configured to detect at least one person which exists in the partial area; and a gathering-score calculation unit configured to detect, based on a detection result of the continued- (Continued)

presence area and a person detection result, continued presence of the plurality of persons in the partial area.

10 Claims, 11 Drawing Sheets

(51) Int. Cl.
*G06T 7/20* (2017.01)
*G06T 7/11* (2017.01)
*G06T 7/194* (2017.01)

(52) U.S. Cl.
CPC ........... *G06T 7/194* (2017.01); *G06T 7/20* (2013.01); *G06T 2207/30196* (2013.01); *G06T 2207/30242* (2013.01)

(56) References Cited

FOREIGN PATENT DOCUMENTS

| JP | 2010-198566 | | 9/2010 |
|----|----|----|----|
| JP | 2010-277547 | | 12/2010 |
| JP | 2010277547 A | * | 12/2010 |
| JP | 4852355 | | 1/2012 |
| JP | 5058010 | | 10/2012 |
| JP | 2013-11950 | | 1/2013 |

* cited by examiner

IMAGE PROCESSING SYSTEM, IMAGE PROCESSING METHOD, AND RECORDING MEDIUM

CROSS-REFERENCE TO RELATED PATENT APPLICATIONS

This application is a National Stage Entry of International Application No. PCT/JP2014/067693, filed Jul. 2, 2014, which claims priority from Japanese Patent Application No. 2013-176082, filed Aug. 27, 2013. The entire contents of the above-referenced applications are expressly incorporated herein by reference.

TECHNICAL FIELD

Some aspects of the present invention relate to an image processing system, an image processing method, and a program.

BACKGROUND ART

Development has been made in recent years for identifying a congestion state and the like, for example, by analyzing video captured by a security camera or the like, in video surveillance and the like. For example, PTL 1 discloses a congestion estimating device which is capable of determining whether or not there is a person in each area by determining whether or not there is motion in each partial area of an input image and determining, on the basis of texture information, whether or not there is a person in each partial area.

In addition to the above, PTLs 2 to 4 also disclose related techniques.

CITATION LIST

Patent Literature

PTL 1: Japanese Unexamined Patent Application Publication No. 2009-110152
PTL 2: Japanese Patent No. 4852355
PTL 3: Japanese Patent No. 5058010
PTL 4: Japanese Unexamined Patent Application Publication No. 2010-198566

SUMMARY OF INVENTION

Technical Problem

There is a demand for being able to identify, in surveillance using a security camera, a state of a plurality of persons being continuously present at a certain place. However, it is difficult, with the technique described in PTL 1, to detect continued presence of people, in a congesting state or in a state of people moving in different directions, for example, when a pedestrian passes by people being continuously present.

Some aspects of the present invention have been made in view of the above-described problem and have an aim to provide an image processing system, an image processing method, and a program which are capable of suitably detecting continued presence of a plurality of persons.

Solution to Problem

An image processing system according to one exemplary aspect of the present invention, the image processing system includes: generation means for generating an background image based on input images captured at a plurality of times by an image-capture device; first detection means for detecting a continued-presence area in a partial area in which an image of a plurality of persons possibly exists in an input image, based on a difference between a first background image generated based on input images captured within a first time width from a processing time and a second background image generated based on input images captured within a second time width from the processing time; second detection means for detecting at least one person which exists in the partial area in the input image; and third detection means for detecting, based on a detection result of the continued-presence area and a person detection result, continued presence of the plurality of persons in the partial area.

An image processing method carried out by an image processing system according to one exemplary aspect of the present invention, the image processing method includes: a step of generating an background image based on input images captured at a plurality of times by an image-capture device; a step of detecting a continued-presence area in a partial area in which an image of a plurality of persons possibly exists in an input image, based on a difference between a first background image generated based on input images captured within a first time width from a processing time and a second background image generated based on input images captured within a second time width from the processing time; a step of detecting at least one person which exists in the partial area in the input image; and a step of detecting, based on a detection result of the continued-presence area and a person detection result, continued presence of the plurality of persons in the partial area.

A program according to one exemplary aspect of the present invention, the program causes a computer to execute: a process of generating an background images based on input images captured at a plurality of times by an image-capture device; a process of detecting a continued-presence area in a partial area in which an image of a plurality of persons possibly exists in an input image, based on a difference between a first background image generated based on input images captured within a first time width from a processing time and a second background image generated based on input images captured within a second time width from the processing time; a process of detecting at least one person which exists in the partial area in the input image; and a process of detecting, based on a detection result of the continued-presence area and a person detection result, continued presence of the plurality of persons in the partial area.

In the present invention, "unit", "means", "device", and "system" do not simply mean physical means but include implementations of the functions of "unit", "means", "device", and "system" by software. In addition, the function of each of "unit", "means", "device", and "system" may be implemented by two or more physical means or devices, or the functions of two or more of "unit", "means", "device", and "system" may be implemented by a single physical means or device.

Advantageous Effects of Invention

According to the present invention, it is possible to provide an image processing system, an image processing method, and a program which are capable of suitably detecting continued presence of a plurality of persons.

DESCRIPTION OF EMBODIMENTS

Exemplary embodiments of the present invention are described below. In the following description and the drawings to be referred to, the same or similar components are denoted by the same or similar reference signs.

1 First Exemplary Embodiment

FIG. 1 to FIG. 10 are drawings for illustrating a first exemplary embodiment. This exemplary embodiment is described below with reference to the drawings as follows. First, "1.1" describes an overview of a method for detecting the continued presence of a plurality of persons in one place (referred to also as "gathering" below) in this exemplary embodiment. Then, "1.2" describes an overview of a functional configuration of an image processing system according to this exemplary embodiment, and "1.3" describes a procedure of a process carried out by the image processing system. "1.4" provides a concrete example of a hardware configuration which can implement the image processing system. Lastly, "1.5" describes other aspects, including effects according to this exemplary embodiment.

(1.1 Overview)
(1.1.1 Gathering Detection Method)

The image processing system according to this exemplary embodiment detects the continued presence of the plurality of persons (gathering) from video captured by an image-capture device, for example, a security camera.

Figure 1:
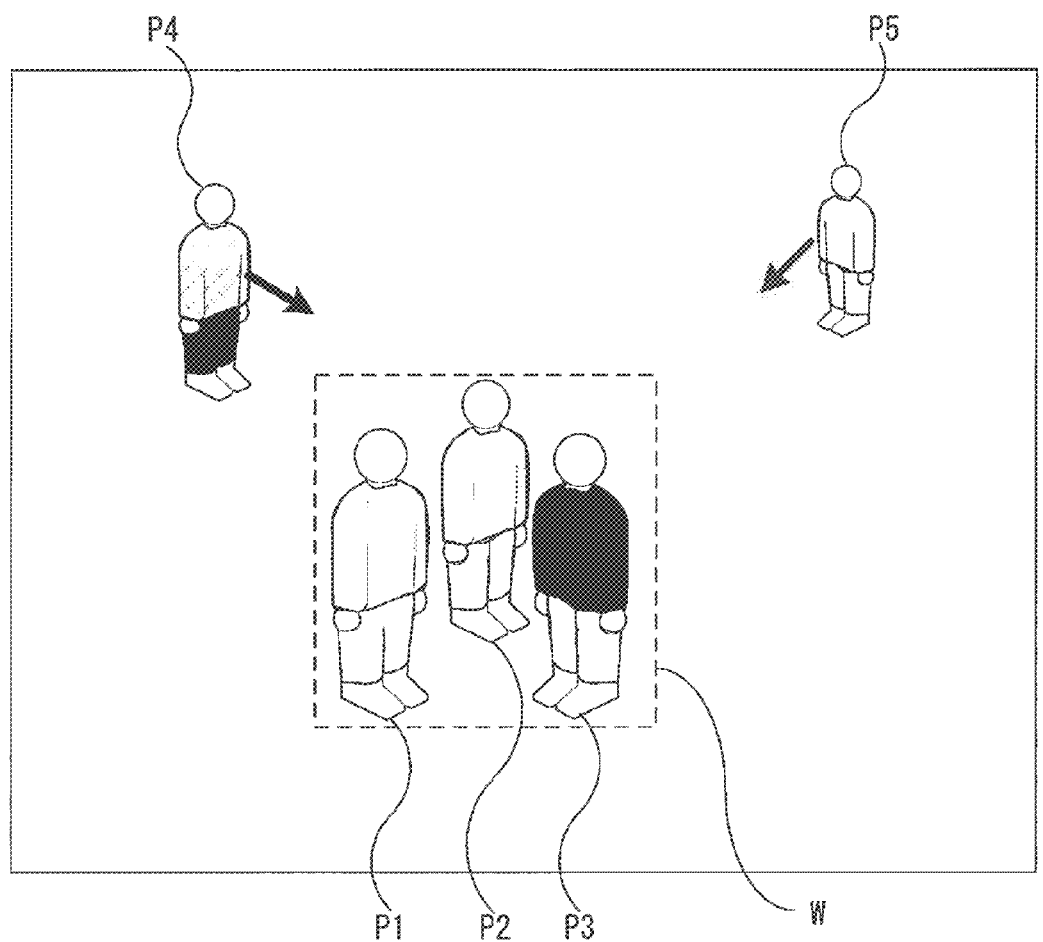
FIG. 1 is a diagram illustrating a concrete example of an output image.

FIG. 1 is a diagram illustrating a concrete example of an image captured by an image-capture device. The image in FIG. 1 includes persons P1 to P5. The persons P1 to P3 have not moved from (have been continuously present at) respective positions close to each other over a certain time period, whereas the persons P4 and P5 have moved. In this case, the image processing system according to this exemplary embodiment determines that a detection window W, which includes the persons P1 to P3, is a gathering area.

For such gathering detection, the image processing system according to this exemplary embodiment first calculates, for the detection window W possibly to be set in an input image, a continued-presence score based on a result of detection of a continuously-present-object area and a complex score based on a result of detection of people, and then calculates a gathering score to be used for the detection of persons' gathering, by using the continued-presence score and the complex score. As a result of this calculation, when the obtained gathering score is larger than or equal to a threshold value, for example, the image processing system determines that there is gathering in the gathering detection window W and informs a user of the occurrence of the gathering by displaying the detection window W on the video as illustrated in FIG. 1. Note that "complex score" in this exemplary embodiment may be referred to also as "crowd density", for example.

The detection window W is set at such a size as to include multiple people (set at a size possible to include three persons in the example in FIG. 1). Many detection windows W may be set in an input image. Detection windows W may overlap each other. The size of each detection window W is set based on the position of the image-capture device, the size of each person, and the number of people to be included, for example. Accordingly, settings are made so that a detection window W set in a lower part of an input image (corresponding to a part near the image-capture device in the capturing-target three-dimensional space) is to be large whereas the detection window W set in an upper part of the input image (corresponding to a part away from the image-capture device in the capturing-target three-dimensional space) is to be small.

Weights for continued-presence scores to be used by the image processing system according to this exemplary embodiment for calculating the gathering score may be set so as to be large for a lower area W1 and small for an upper area W2 in the detection window W. In this case, a detection result of the continued presence in the lower area W1 in the detection window W has a larger influence on the gathering score than that of the upper area W2. This is because continued presence can be suitably detected with reference to the lower area W1 since humans normally move less at the lower halves of their bodies than the upper halves of their bodies while standing still.

When a technique for detecting a head or the upper half of a body is employed as a method for detecting a person, the complex score for each detection window W may be calculated by setting a larger weight for the upper area W2 than that for the lower area W1. This is because it is assumed that, when gathering desired to be detected is present in the detection window W set according to the size of people, the heads or the upper halves of the bodies are likely to be positioned in the upper part of the detection window W.

Figure 2:
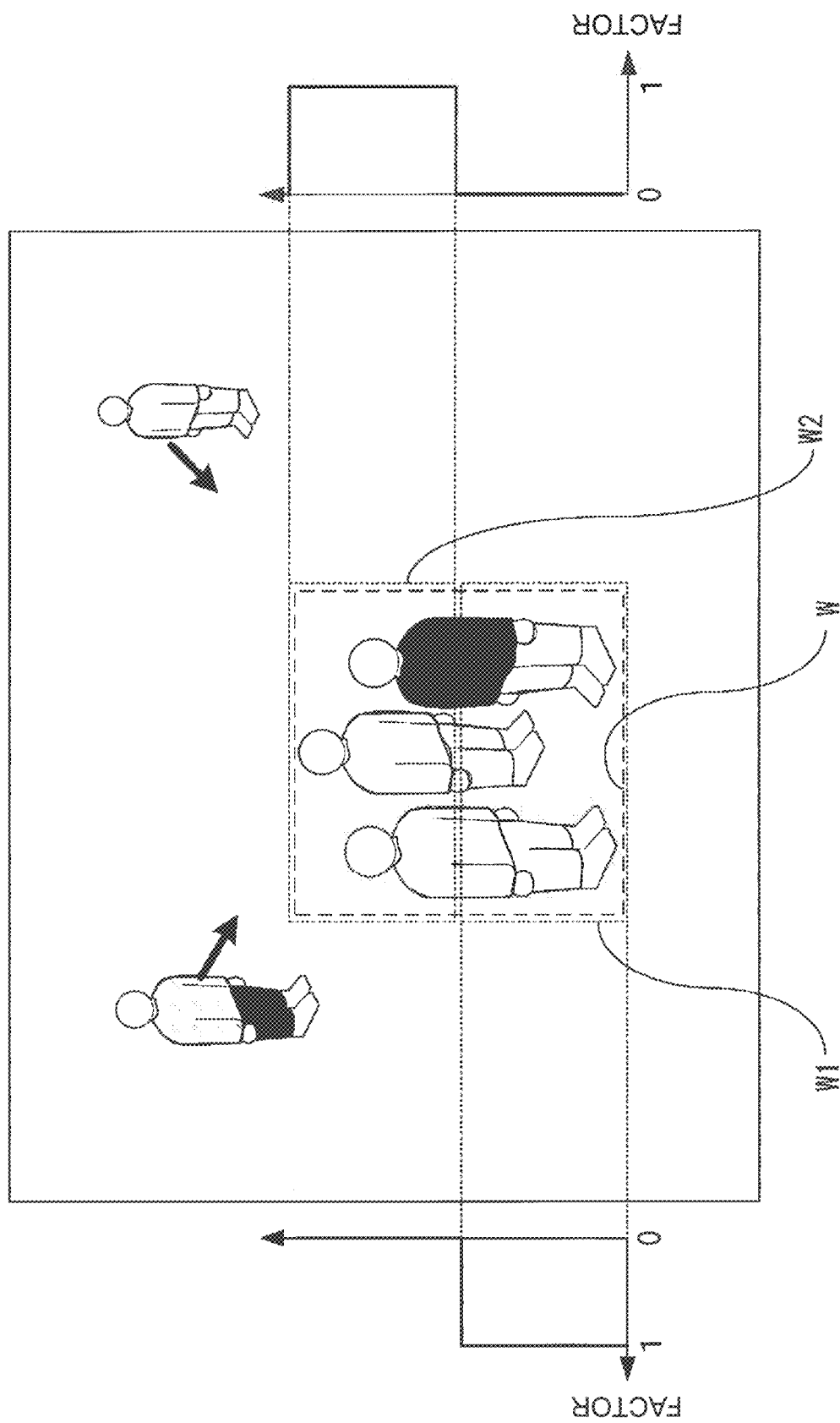
FIG. 2 is a diagram for illustrating a concrete example of factors used for gathering detection.

FIG. 2 illustrates a concrete example of factors (weights) by which the continued-presence score and the complex score are multiplied to calculate the gathering score. In the example in FIG. 2, the factor by which the continued-presence score for the lower area W2 is multiplied is set at one, and the factor by which the continued-presence score for the upper area W1 is multiplied is set at zero; and the factor by which the complex score for the lower area W2 is multiplied is set at zero, and the factor by which the continued-presence score for the upper area W2 is multiplied is set at one. However, a factor setting method to be employed is not limited to this. For example, any values may be set as the factors for continued-presence scores as long as the value for the lower area W1 has a larger influence than that for the upper area W2, which means that the factors do not need to be set on a binary basis as the example illustrated in FIG. 2. This applies similarly to the factors for complex scores.

The same results can be obtained, when one of the factors for the upper area W2 and the lower area W1 is set at one and the other factor is set at zero, by calculating the complex score only for the upper area W2 and calculating the continued-presence score only for the lower area W1. Although a case of using factors is described in the following description, the complex score or the continued-presence score may be calculated only for one of the upper area W1 and the lower area W2 as described above.

(1.1.2 Continued-Presence-Score Calculation Method)

An overview of a continued-presence-score calculation method is described below with reference to FIG. 3 to FIG. 5.

A conceivable method for detecting the continued presence of an object from images constituting a video is to generate a background image, for example, by averaging many captured images captured within a long time period (also referred to as a long time window, below), compare the background image with a background image generated, for example, by averaging captured images captured within a time period which is shorter than the long time period (also referred to as a short time window, below), and detect an object included in many of the images captured in the short time period as a continuously present object. Generating an average image (background image) from the images captured within a certain time period as described above reduces the influence of a moving object (including a person) which moves out from the frames in short time, on the average image, for example, consequently making it easier to extract a static object. In this exemplary embodiment, an image generated based on multiple images and consequently having a reduced influence of a moving object is referred to as a background image.

However, in such a technique, when a flow of people constantly occurs, the influence of the flow of people is still large even if captured images are, for example, averaged, and therefore the state of the flow of people being blended into a background is different between the background image of a long time window and the background image of a short time window. This is likely to cause problems, such as detection failures and incorrect detection of a static object.

In view of this, the image processing system according to this exemplary embodiment generates a background image by first separating each of captured images into an area of a moving object (referred to also as "foreground area", below) and the other area corresponding to a static area (referred to also as "background area", below) and then, for example, averaging the static areas of the respective captured images in a time direction. This allows, even when a flow of people or the like has occurred, an area in which the flow of people has occurred to be a foreground area, consequently reducing the influence of the flow of people on a background image to be generated. By comparing a background image of a long time window and a background image of a short time window generated in the above manner, a continuously present object can be suitably detected. A concrete example of a procedure of this process is described below with reference to FIG. 3 to FIG. 5.

Figure 3:
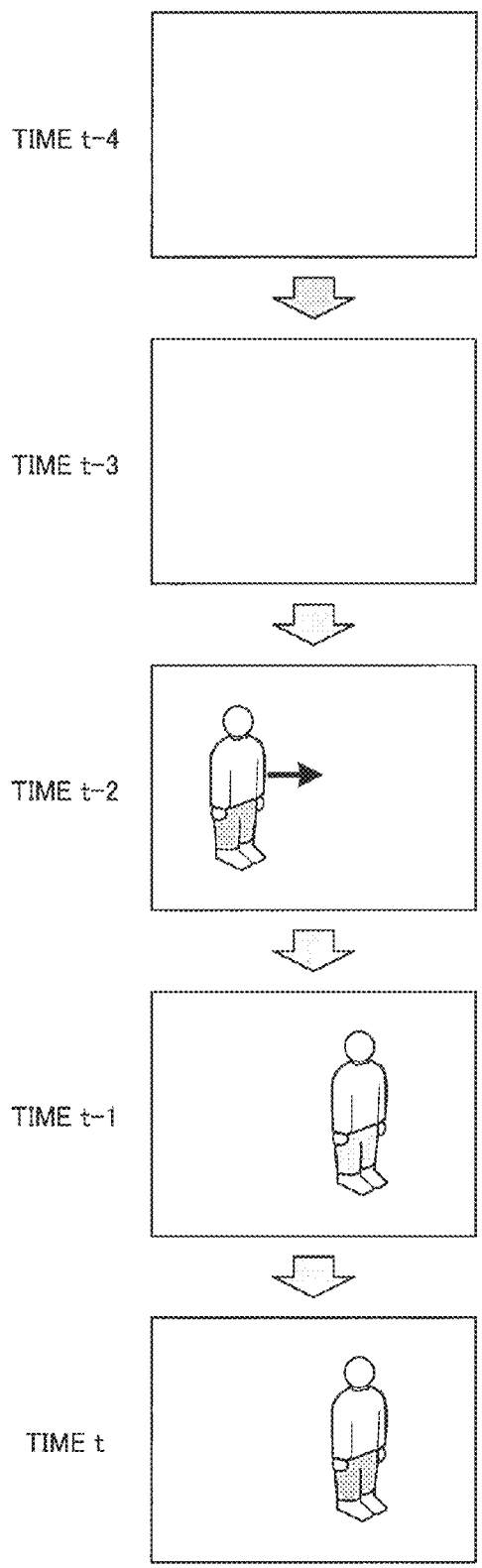
FIG. 3 is a diagram illustrating a concrete example of input images.
Figure 4:
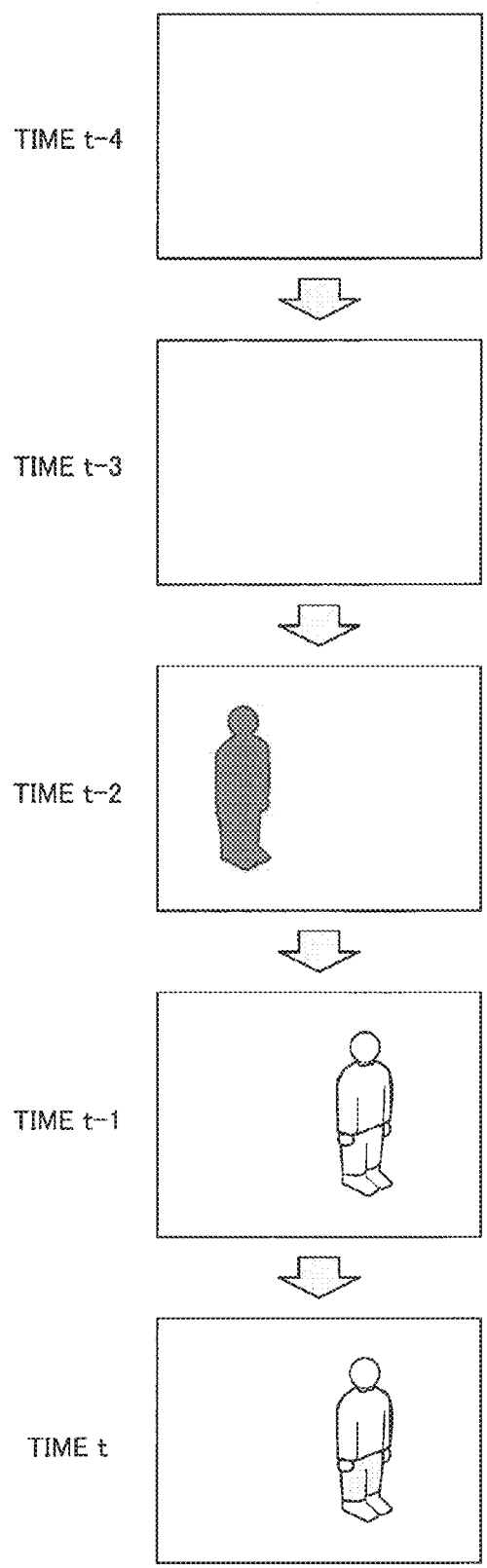
FIG. 4 is a diagram illustrating a concrete example of background areas detected in the input images.

FIG. 3 is a diagram illustrating a concrete example of input images captured at respective times t-4 to t. Here, the images captured at the time t-4 and the time t-3 include no person, and the images captured at the times t-2 to t include a person. The person is moving at the time t-2 and is standing still at the time t-1 and the time t.

The image processing system according to this exemplary embodiment separates each of input images as those illustrated in FIG. 3 into a moving area (foreground area) and a static area (background area). FIG. 2 is a diagram illustrating an example of images obtained when only a static area is extracted from each of the input images in FIG. 1. As described above, since the person is moving in the image at the time t-2, the area including the person is excluded as a moving area from the image. All the other images include no moving area, which means that the entire images are static areas, and hence have no change from the corresponding input images.

Figure 5:
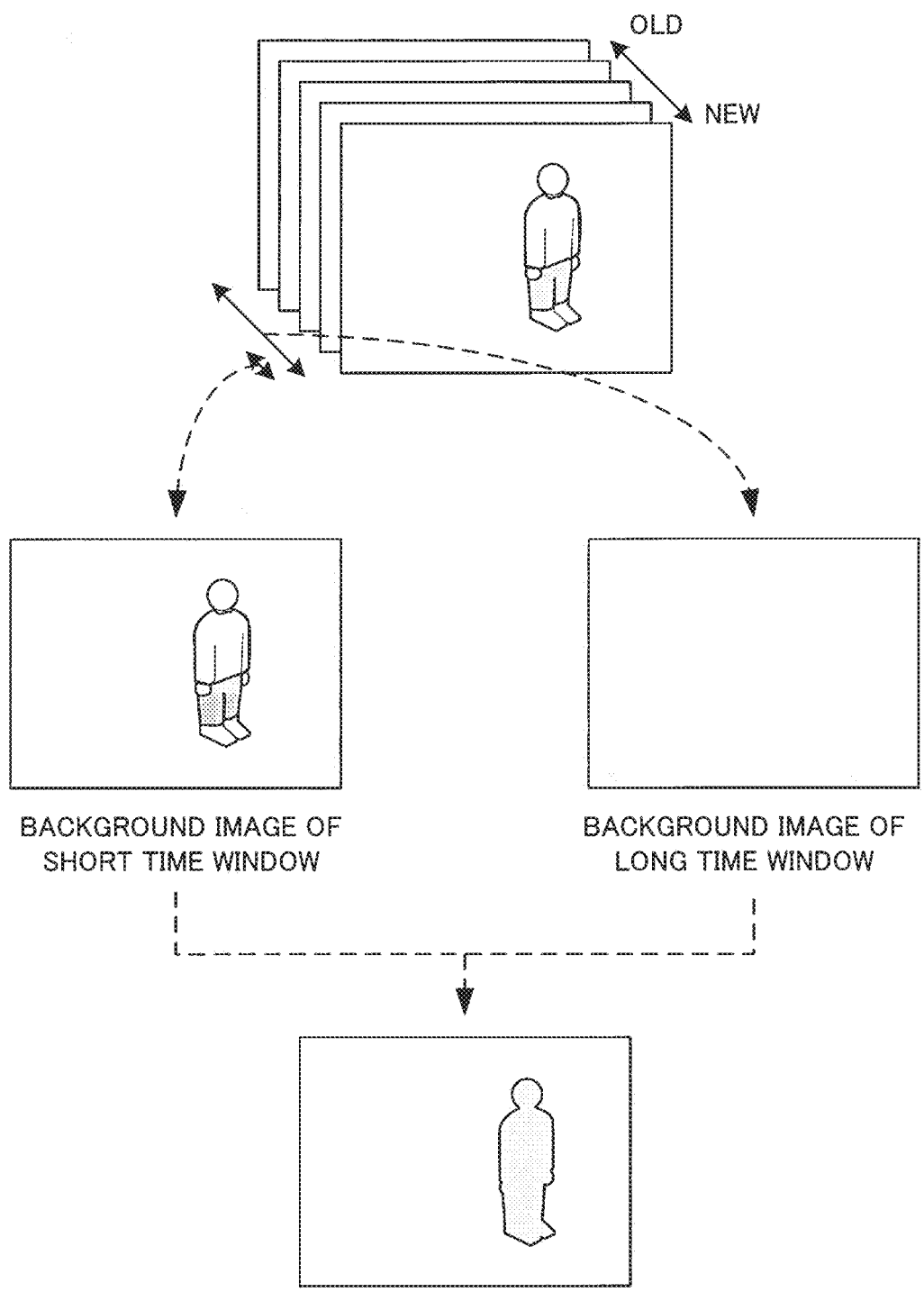
FIG. 5 is a diagram illustrating a concrete example of a background-image generation method.

As illustrated in FIG. 5, the image processing system according to this exemplary embodiment generates, for each of multiple time windows, a background image from the images of the times t-4 to t obtained by extracting only static areas. The background image can be generated by obtaining, for each of the pixels of the image, the average, the median, or the mode of the pixel values of the static areas of the respective images captured in a certain time period from the time point before the current time t to the current time t. With the background image thus generated for each of the short time window and the long time window, the image processing system compares background images of a short time window and a long time window, extracts pixels each having a difference that is larger than a threshold value, and consequently identifies the area consisting of the extracted pixels as a continued-presence area. The continued-presence score can be calculated as the size (for example, the number of pixels) of the continued-presence area.

In the example in FIG. 5, no person is included in the background image of the long time window. This is because the influence of the person included only in the images captured in a short time period is reduced by taking, for each pixel, the mode, the median, or the like of the pixel values in generating the background image.

The image processing system according to this exemplary embodiment suitably detects the continuously present object in the process illustrated in FIG. 5, as illustrated in the image at the bottom in FIG. 5.

(1.2 Overview of System)

Figure 6:
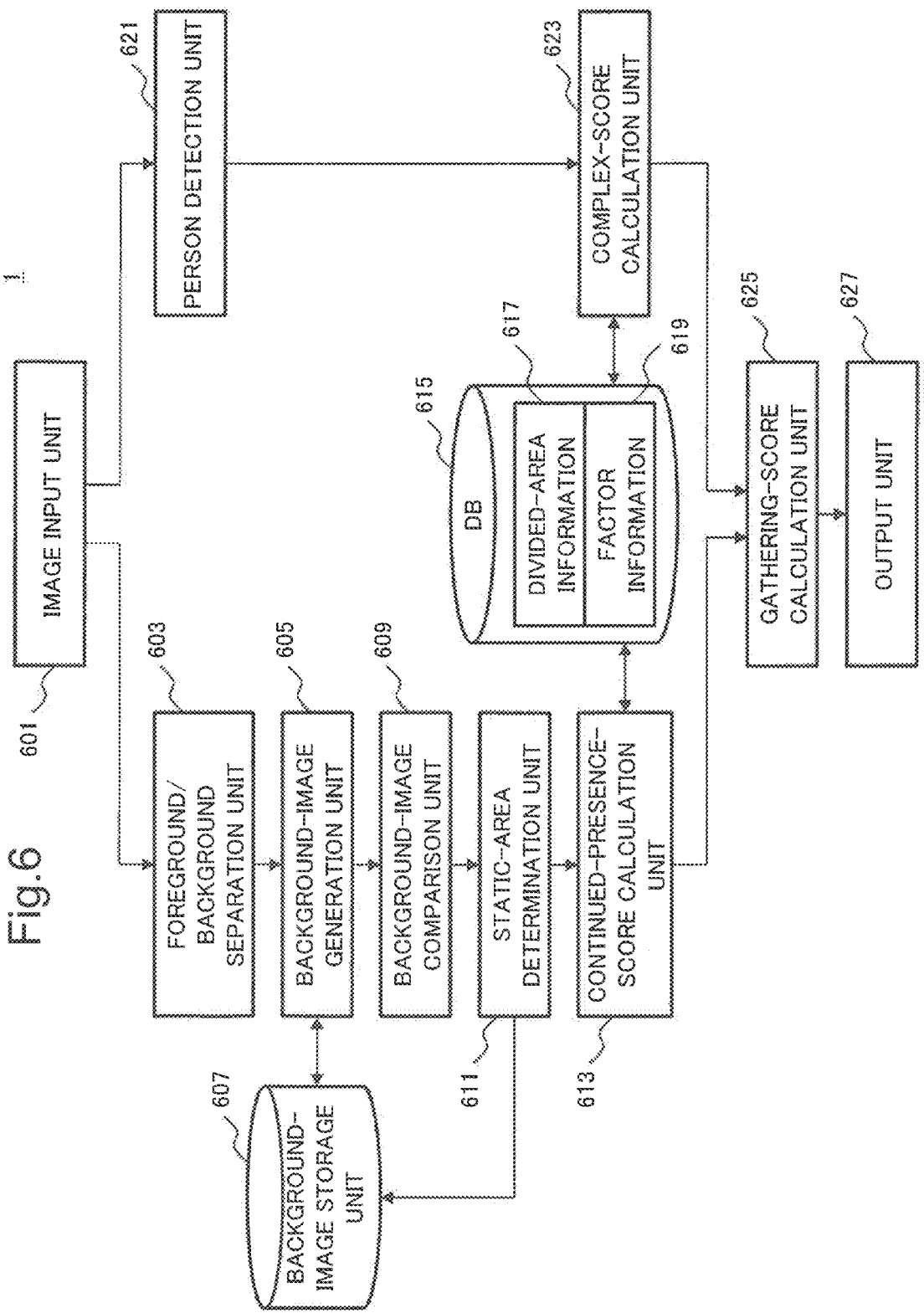
FIG. 6 is a functional block diagram illustrating a schematic configuration of an image processing system according to a first exemplary embodiment.

A system configuration of an image processing system 1 according to this exemplary embodiment is described below with reference to FIG. 6. FIG. 6 is a block diagram illustrating a system configuration of the image processing system 1.

The image processing system 1 includes an image input unit 601, a foreground/background separation unit 603, a background-image generation unit 605, a background-image storage unit 607, a background-image comparison unit 609, a static-area determination unit 611, a continued-presence-score calculation unit 613, a database (DB) 615, a person detection unit 621, a complex-score calculation unit 623, a gathering-score calculation unit 625, and an output unit 627.

The image input unit 601 sequentially receives inputs of frame images included in a video input by an unillustrated image-capture device, such as a security camera. This means that the frame images are captured at different capture times. Alternatively, the image input unit 601 may receive inputs of frame images obtained by decoding video data stored in an unillustrated hard disk drive (HDD) or video cassette recorder (VCR).

The foreground/background separation unit 603 sequentially separates each of the input images input by the image input unit 601, into a foreground area and a background area by use of a technique, such as a background subtraction method or optical flow. Here, a foreground area is an area including motion in the image, and a background area is an area including no motion (being still) in the image.

In the technique using optical flow, the foreground/background separation unit 603 first compares a frame with the previous frame, for example, on a macro-block-by-macro-block basis, and identifies each block including motion. More specifically, the foreground/background separation unit 603 identifies each block including motion by finding, for each of the macroblocks (groups of pixels) of a processing-target image, a macroblock similar to the macroblock in the image captured immediately before the processing-target image (block matching), for example.

When the background subtraction method is employed, the foreground/background separation unit 603 identifies a moving object by comparing the differences between a background image acquired in advance and a processing-target image.

The background-image generation unit 605 generates a background image using a background area (image of the static area) extracted by the foreground/background separation unit 603 and the background areas related to the images captured within multiple predetermined time windows stored in the background-image storage unit 607. The background-image generation unit 605 can generate such a background image by calculating, for each of the pixel positions in the background areas of the respective images, the average, the median, or the mode of the pixel values for each of the time windows.

The background-image storage unit 607 stores images related to the background areas of the respective input images sequentially extracted by the foreground/background separation unit 603 for a certain time period. Alternatively, the background-image storage unit 607 stores the background images for the respective time windows generated by the background-image generation unit 605 as the process carried out by the background-image generation unit 605 proceeds.

The background-image comparison unit 609 compares the background images generated for the respective time windows by the background-image generation unit 605. More specifically, the background-image comparison unit 609 can detect a static object (continuously present object) standing still for a certain time period by comparing the background image generated for the longest time window (background image assumed to consist of a genuine background) and the background image generated for a time window shorter than the longest time window. For this detection, by generating background images from backgrounds of multiple time windows, the background-image comparison unit 609 may detect a static object while categorizing the static object according to the length of the static time period.

A background-image comparison method employed by the background-image comparison unit 609 may be, for example, a method using, for each pixel, the absolute value of the difference between the pixel values of background images, a method of calculating, while operating a small rectangular area on images, the correlation between the pixel values in the rectangular area, or a method of calculating the histogram distance between the pixel values in the rectangular area. To employ a technique using a rectangular area, a certain size, such as a macroblock, may be set, or different sizes may be set for areas on the images in consideration of the size of a detection-target object (person) appearing on the images, by use of camera parameters (set, for example, according to the position at which a camera is installed) (for example, a large size may be set for the rectangular area for an image area including a position near the image-capture device, whereas a small size may be set for the rectangular area for an image area including a position away from the image-capture device).

The static-area determination unit 611 identifies each pixel having a difference exceeding the threshold value as a result of comparison by the background-image comparison unit 609, for example, and determines the image area consisting of the pixels as a continued-presence area. Although the static-area determination unit 611 identifies a continued-presence area from the entire input image in this exemplary embodiment, the area from which a continued-presence area is identified is not limited to this, and the static-area determination unit 611 may identify a continued-presence area from an area including at least the processing-target detection window W.

The continued-presence-score calculation unit 613 calculates the continued-presence score for the processing-target detection window W by use of the continued-presence area determined by the static-area determination unit 611. A conceivable method for calculating the continued-presence score is to calculate the continued-presence score based on, for example, the number of pixels in the continued-presence area in the detection window W as described above. Information on the position and the size of the detection window W may be set in advance in the DB 615 as divided-area information 617. Multiple detection windows W may be set for an input image, and more specifically, it is conceivable to set many detection windows W over the entire input image so that the detection windows W overlap each other, for example. In addition, it is conceivable that each detection window W is set at such a size as to be able to include people the number of which is larger than or equal to the number of people detected as gathering. It is also conceivable to set the detection windows W according to the positional relationship with the image-capture device (for example, by use of unillustrated camera parameters) so that the detection window W positioned near the image-capture device is large and the detection window W positioned away from the image-capture device is small.

In this exemplary embodiment, each continued-presence score may be further multiplied by a factor which is set so that the lower area W1 has a larger influence than the upper area W2, as described above. Each factor is stored in the DB 615 as factor information 619.

The person detection unit 621 detects a person from the images input by the image input unit 601. Among various conceivable methods for detecting a person, an example of such a method is to prepare the characteristics of a head, the upper half of a body, the entire body, or a crowd patch on an image by use of a learning machine which has learnt the characteristics, and to detect the corresponding part, such as a head or the upper half of a body, using the learning machine from the input images.

In this exemplary embodiment, the person detection unit 621 detects a person from the entire input image. However, the detection-target area is not limited to this, and the person detection unit 621 may detect a person from any area including at least the processing-target detection window W.

The complex-score calculation unit 623 calculates the complex score of the processing-target detection window W based on the person detection result obtained by the person detection unit 621. An example of a conceivable method for calculating the complex score is to calculate the complex score based on the number of people or the like detected in the detection window W. The complex-score calculation unit 623 calculates the complex score by use of factors set so that the influence of the upper area W2 is to be larger than that of the lower area W1 as described above. The factors are stored as factor information 619.

The complex-score calculation unit 623 may store the numbers of people in the processing-target detection window W in the chronological order and detect an increase or a decrease in the number.

The gathering-score calculation unit 625 calculates the gathering score of the processing-target detection window W by use of the continued-presence score calculated by the continued-presence-score calculation unit 613 and the complex score calculated by the complex-score calculation unit 623. Among various conceivable methods for calculating the gathering score, an example of such a method is to use, as the gathering score, the value obtained by multiplying the continued-presence score and the complex score each of which is multiplied by the corresponding factor.

The output unit 627 outputs a gathering detection result based on the gathering score calculated by the gathering-score calculation unit 625. Among various conceivable output methods, examples of such a method are to display a numeric value corresponding to the gathering score of the detection window W (when multiple detection windows W are set, the gathering scores of the respective detection windows W may be displayed) and to superimpose the detection window W corresponding to the gathering score (for example, an image indicating the detection window W having a width corresponding to the gathering score) on the input image. Another conceivable example is to vocally inform the user of information corresponding to the gathering score.

When the complex-score calculation unit 623 detects an increase or a decrease in the number of people in the chronological order as described above, the output unit 627 may additionally output information indicating that the number of people is gradually increasing in a certain area (people are gradually gathering in a certain area).

For the output, the output unit 627 may inform, only when the gathering score exceeds a threshold value, the user of the state. Alternatively, the output unit 627 may inform the user of the state according to the time period of the gathering score exceeding the threshold value. The threshold value of the gathering score may be set in advance or may be set by a user input.

When the complex-score calculation unit 623 is configured to detect an increase or a decrease in the number of people, the output unit 627 may additionally output the information on the increase or decrease.

(1.3 Procedure of Process)

Figure 7:
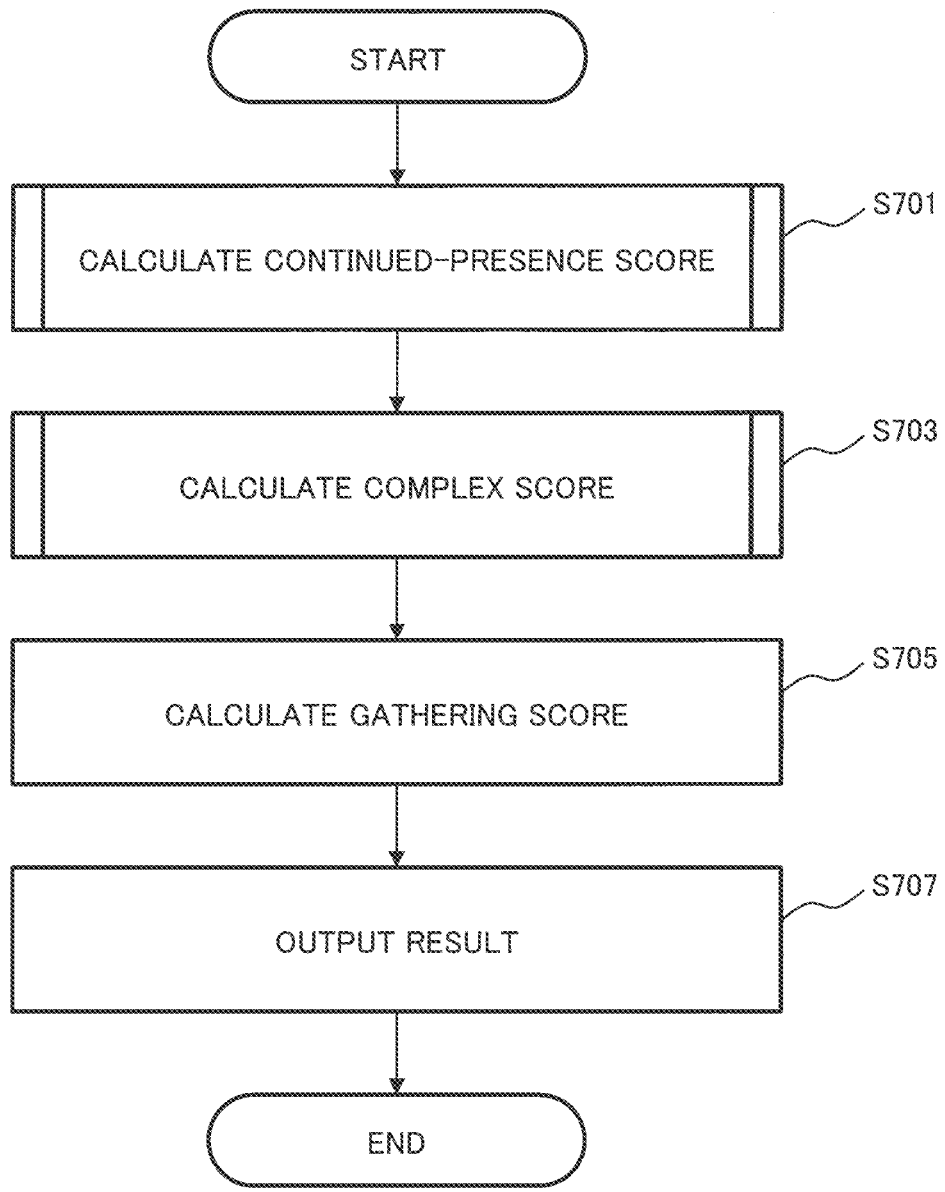
FIG. 7 is a flowchart illustrating a procedure of a process carried out by the image processing system illustrated in FIG. 6.
Figure 8:
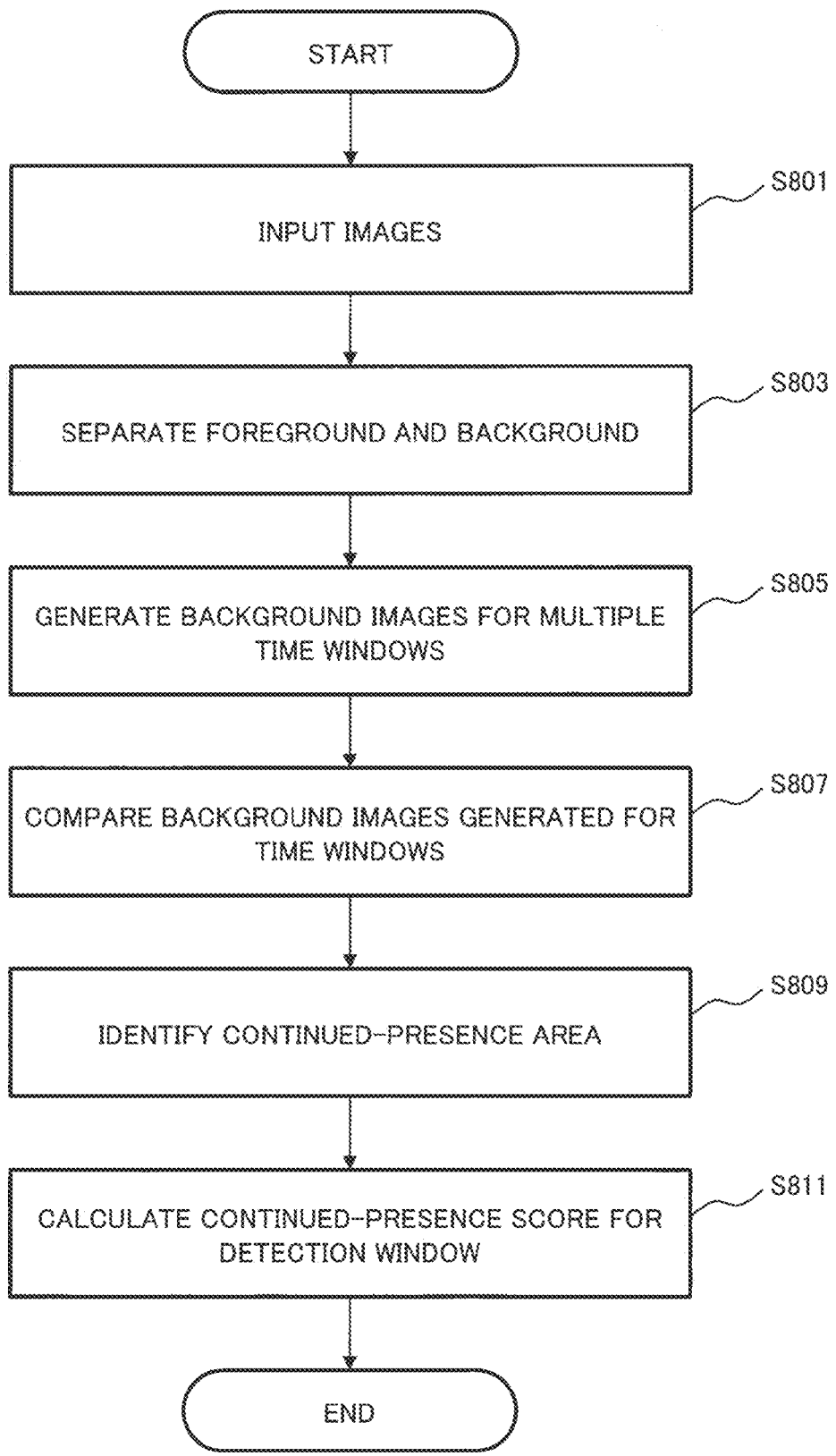
FIG. 8 is a flowchart illustrating a procedure of a process carried out by the image processing system illustrated in FIG. 6.
Figure 9:
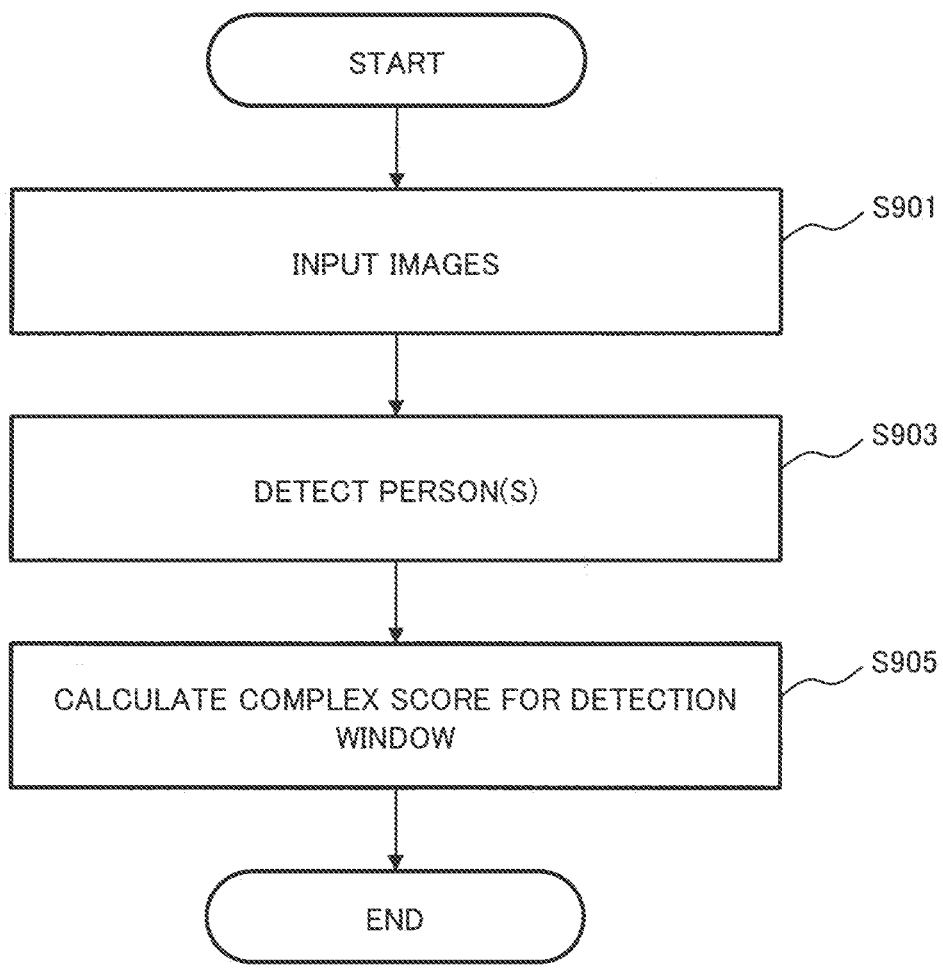
FIG. 9 is a flowchart illustrating a procedure of a process carried out by the image processing system illustrated in FIG. 6.

The procedure of a process carried out by the image processing system 1 is described below with reference to FIG. 7 to FIG. 9. FIG. 7 to FIG. 9 are flowcharts illustrating the procedure of the process carried out by the image processing system 1 according to this exemplary embodiment.

The operation steps to be described below may be carried out in any modified order or in parallel, or one or more steps may be added between the operation steps, as long as no conflict occurs in the operations. In addition to this, a step described as a single step for convenience may be carried out in multiple steps, and steps described as multiple separate steps for convenience may be carried out as a single step.

(1.3.1 Procedure of Entire Process)

First, the procedure of the entire process is described with reference to FIG. 7.

The continued-presence-score calculation unit 613 calculates the continued-presence score of the detection window W on images input by the image input unit 601 (S701). The procedure of the process carried out by the image processing system 1 before the calculation of the continued-presence score is to be described later with reference to FIG. 8.

The complex-score calculation unit 623 calculates the complex score of the detection window W on the images input by the image input unit 601 (S703). The procedure of the process carried out by the image processing system 1 before the calculation of the complex score is to be described later with reference to FIG. 9. Note that the operations in Step S701 and S703 may be performed in reverse order or may be performed in parallel.

After the continued-presence score and the complex score are calculated, the gathering-score calculation unit 625 calculates the gathering score based on the continued-presence score and the complex score (S705). The output unit 627 outputs a gathering detection result regarding the detection window W based on the calculated gathering score (S707).

(1.3.2 Procedure of Process for Continued-Presence-Score Calculation)

Next, the procedure of the process for continued-presence-score calculation by the image processing system 1 is described with reference to FIG. 8. This process corresponds to Step S701 in FIG. 7.

First, the image input unit 601 receives inputs of images captured by an image-capture device, such as a video camera, or an image obtained by reading video data on a video captured by an image-capture device and decoding the video data (S801).

The foreground/background separation unit 603 separates each of the images input by the image input unit 601 into a background area, which is static, and a foreground area, which includes motion (S803). The generated image of the background area is stored, for example, in the background-image storage unit 607.

The background-image generation unit 605 generates a background image by use of the background areas identified by the foreground/background separation unit 603 from the images captured within a predetermined time window (S805). In this generation, the background-image generation unit 605 generates a background image for each of multiple time windows according to the continued-presence time period of the people related to the gathering to be extracted.

The background-image comparison unit 609 compares the background images generated by the background-image generation unit 605 for the respective time windows (S807), and the static-area determination unit 611 determines, as a continued-presence area, the area having the difference between the background images which is larger than or equal to a threshold value (S809). The continued-presence-score calculation unit 613 calculates the continued-presence score based on, for example, the size of the continued-presence area in the processing-target detection window W (S811). Here, the continued-presence score may be multiplied by a predetermined factor based on the position or the like of the pixels included in the continued-presence area in the detection window W.

(1.3.3 Procedure of Process for Complex-Score Calculation)

Next, the procedure of the process for complex-score calculation carried out by the image processing system 1 is described with reference to FIG. 9. This process corresponds to S703 in FIG. 7.

First, the image input unit 601 receives inputs of images captured by an image-capture device, such as a video camera, or an image obtained by reading video data on a video captured by an image-capture device and decoding the video data (S901). This operation and S801 in the process in FIG. 8 may be in common.

The person detection unit 621 detects a person from each of the input images (S903). As described above, a conceivable method for detecting a person may be to detect a head or to detect the upper half of a body, for example.

The complex-score calculation unit 623 calculates the complex score of the processing-target detection window W based on a person detection result obtained by the person detection unit 621 (S905). The complex score is calculated based on, for example, the number of people detected in the detection window W. The complex score may be multiplied by a predetermined factor based on the position or the like of the detected person in the detection window W.

(1.4 Hardware Configuration)

An example of a hardware configuration employed when the above-described image processing system 1 is implemented by a computer is described below with reference to FIG. 10. The functions of the image processing system 1 may be implemented by multiple information processing devices.

Figure 10:
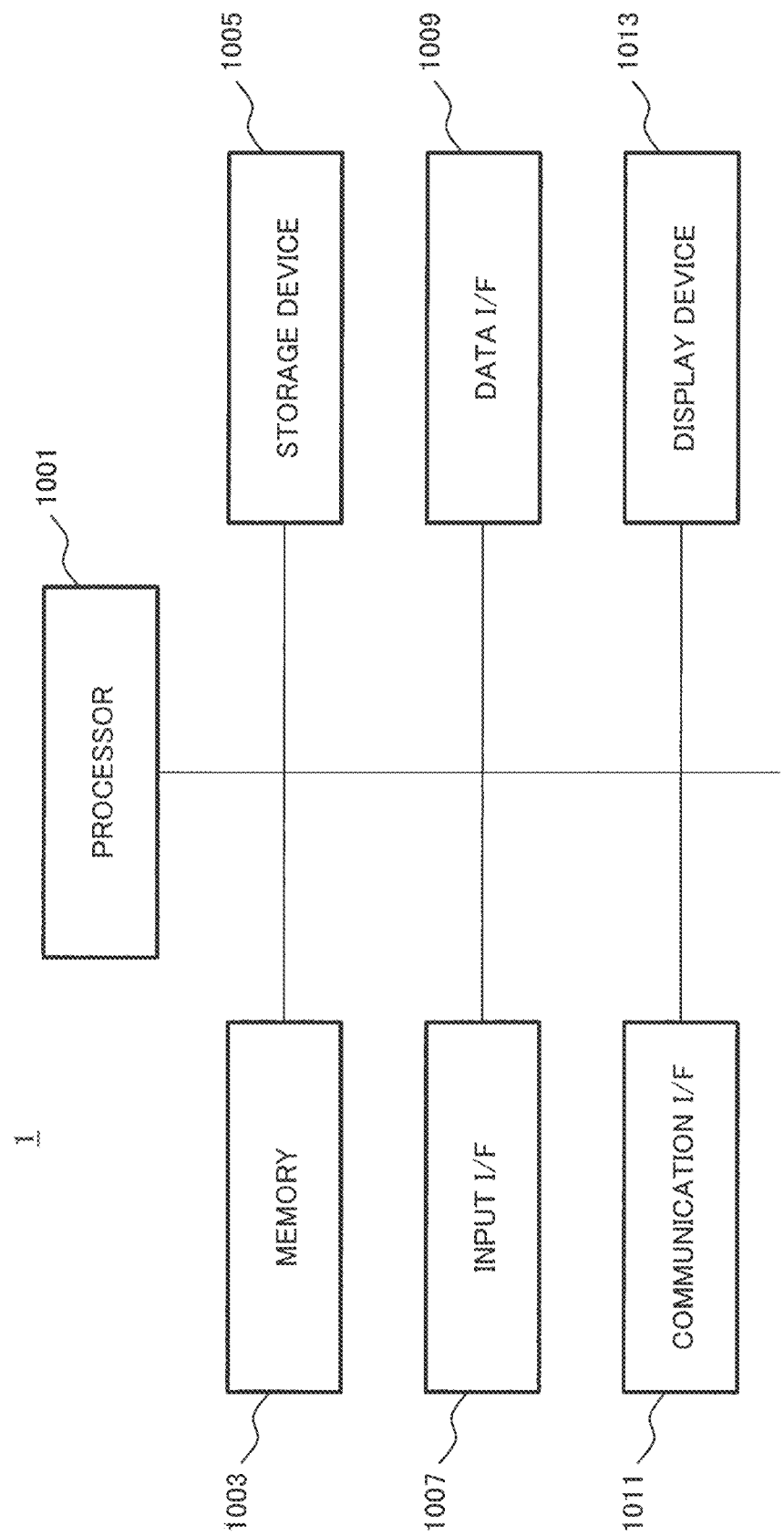
FIG. 10 is a block diagram illustrating a hardware configuration which can implement the image processing system illustrated in FIG. 6.

As illustrated in FIG. 10, the image processing system 1 includes a processor 1001, a memory 1003, a storage device 1005, an input interface (I/F) 1007, a data I/F 1009, a communication I/F 1011, and a display device 1013.

The processor 1001 controls various processes carried out by the image processing system 1 by executing programs stored in the memory 1003. For example, the processes related to the image input unit 601, the foreground/background separation unit 603, the background-image generation unit 605, the background-image comparison unit 609, the static-area determination unit 611, the continued-presence-score calculation unit 613, the person detection unit 621, the complex-score calculation unit 623, the gathering-score calculation unit 625, and the output unit 627 illustrated in FIG. 6 may be implemented as programs which are temporarily stored in the memory 1003 and operate mainly on the processor 1001.

The memory 1003 is, for example, a storage medium, such as a random access memory (RAM). The memory 1003 temporarily stores the program code of each program executed by the processor 1001, data necessary to execute the programs, and the like. For example, the storage area of the memory 1003 includes a stack area necessary to execute the programs.

The storage device 1005 is, for example, a nonvolatile storage medium, such as a hard disk or a flash memory. The storage device 1005 stores, for example, an operating system, various programs for implementing the image input unit 601, the foreground/background separation unit 603, the background-image generation unit 605, the background-image comparison unit 609, the static-area determination unit 611, the continued-presence-score calculation unit 613, the person detection unit 621, the complex-score calculation unit 623, the gathering-score calculation unit 625, and the output unit 627, and various data of the background-image storage unit 607 and the DB 615. The programs and data stored in the storage device 1005 are loaded into the memory 1003 when needed, and are referred to by the processor 1001.

The input I/F 1007 is a device for receiving an input from the user. Concrete examples of the input I/F 1007 are a keyboard, a mouse, and a touch panel. The input I/F 1007 may be connected to the image processing system 1 via an interface, such as a universal serial bus (USB).

The data I/F 1009 is a device for inputting data from outside the image processing system 1. A concrete example of the data I/F 1009 is a drive for reading data stored in various storage media. The data I/F 1009 may be provided outside the image processing system 1. In this case, the data I/F 1009 is connected to the image processing system 1 via an interface, such as a USB.

The communication I/F 1011 is a device for wired or wireless data communication with a device provided outside the image processing system 1, such as a video camera. The communication I/F 1011 may be provided outside the image processing system 1. In this case, the communication I/F 1011 is connected to the image processing system 1 via an interface, such as a USB.

The display device 1013 is a device for displaying various information, such as a video, as that illustrated in FIG. 1. Concrete examples of the display device 1013 are a liquid crystal display and an organic electro-luminescence (EL) display. The display device 1013 may be provided outside the image processing system 1. In this case, the display device 1013 is connected to the image processing system 1 via a display cable, for example.

(1.5 Effects of this Exemplary Embodiment)

As described above, the image processing system 1 according to this exemplary embodiment detects the continued presence of the plurality of persons (gathering) by use of the continued-presence score calculated based on continued-presence areas in input images and the complex score calculated based on a person(s) detected from the input images. In this way, the image processing system 1 can suitably detect an area which includes many objects being continuously present for a certain time period or longer and in which many people are present as gathering.

For detection of the continued-presence area, even when the continued-presence area of multiple people is temporarily hidden behind moving people or the like, the image processing system 1 can suitably detect gathering with little influence of the moving objects, by use of background images generated from images captured at multiple times.

2 Second Exemplary Embodiment

Figure 11:
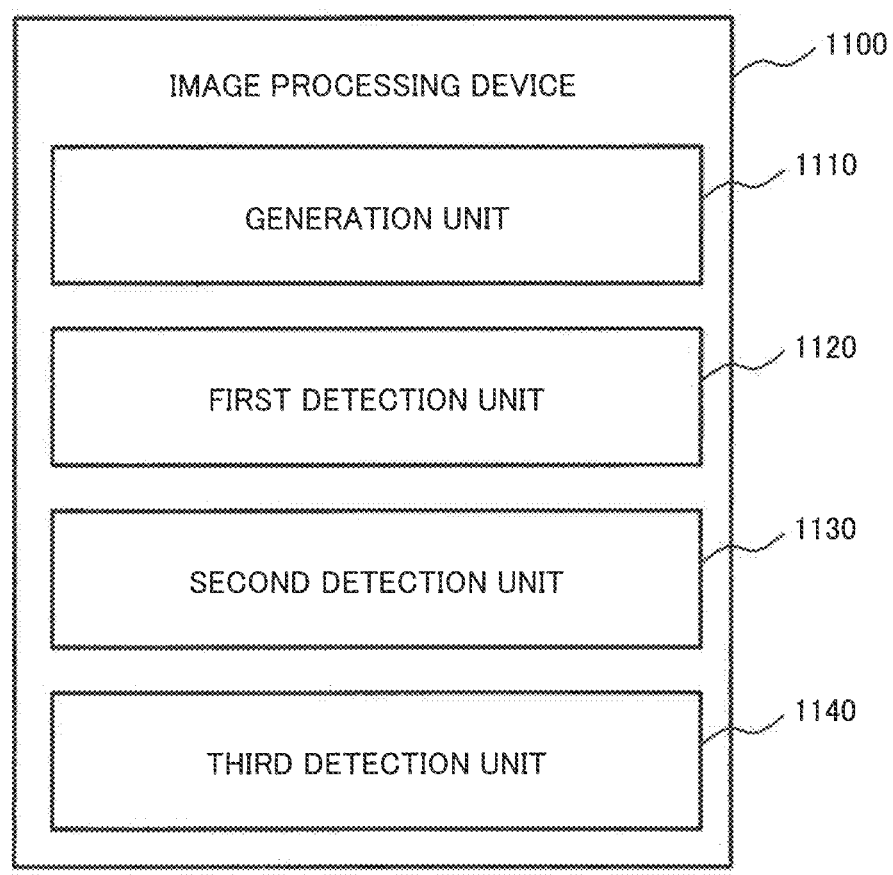
FIG. 11 is a functional block diagram illustrating a schematic configuration of an image processing system according to a second exemplary embodiment.

A second exemplary embodiment is described below with reference to FIG. 11. FIG. 11 is a block diagram illustrating a functional configuration of an image processing system 1100. As illustrated in FIG. 11, the image processing system 1100 includes a generation unit 1110, a first detection unit 1120, a second detection unit 1130, and a third detection unit 1140.

The generation unit 1110 generates a background image based on input images captured at multiple times by an image-capture device.

Based on the difference between a first background image generated based on input images captured within a first time width from a processing time and a second background image generated based on input images captured within a second time width from the processing time, the first detection unit 1120 detects a continued-presence area in partial area in the input image, the partial area being an area in which an image of a plurality of persons possibly exists.

The second detection unit 1130 detects at least one person which exists in partial area in the input image.

The third detection unit 1140 detects the continued presence of the plurality of persons in the partial area based on a detection result of the continued-presence area and a person detection result.

With this implementation, the image processing system 1100 according to this exemplary embodiment can suitably detect the continued presence of a plurality of persons.

3 Supplementary Notes

The configurations of the above-described exemplary embodiments may be combined or may be partially interchanged. In addition to this, the configuration of the present invention is not limited only to the above-described exemplary embodiments and may include various changes without departing from the gist of the present invention.

Although part of or the entire of each of the above-described exemplary embodiments may be described as the following supplementary notes, the present invention is not limited thereto. A program of the present invention may be any program which causes a computer to execute the operations described in each of the above-described exemplary embodiments.

(Supplementary Note 1)

An image processing system including: generation means for generating an background image based on input images captured at a plurality of times by an image-capture device; first detection means for detecting a continued-presence area in a partial area in which an image of a plurality of persons possibly exists in an input image, based on a difference between a first background image generated based on input images captured within a first time width from a processing time and a second background image generated based on input images captured within a second time width from the processing time; second detection means for detecting at least one person which exists in the partial area in the input image; and third detection means for detecting, based on a detection result of the continued-presence area and a person detection result, continued presence of the plurality of persons in the partial area.

(Supplementary Note 2)

The image processing system according to Supplementary Note 1, wherein the background image is generated based on a static area including no motion, in the input images.

(Supplementary Note 3)

The image processing system according to Supplementary Note 1 or 2, wherein a size of the partial area is set depending on a position of the image-capture device capturing input images and the partial area in the input image.

(Supplementary Note 4)

The image processing system according to any one of Supplementary Notes 1 to 3, wherein the detection result of the continued-presence area in a lower area of the partial area has a larger influence on the detection result of the continued-presence area of the plurality of persons than the detection result of the continued-presence area in an upper area of the partial area.

(Supplementary Note 5)

The image processing system according to any one of Supplementary Notes 1 to 4, further including output means for informing about the detection result of the continued presence of the plurality of persons in the partial area.

(Supplementary Note 6)

The image processing system according to Supplementary Note 5, wherein the output means changes an informing method depending on a degree of the continued presence of the plurality of persons.

(Supplementary Note 7)

The image processing system according to Supplementary Note 5, wherein the output means informs based on a time period in which a degree of the continued presence of the plurality of persons exceeds a threshold value.

(Supplementary Note 8)

The image processing system according to Supplementary Note 7, wherein the threshold value is user-settable.

(Supplementary Note 9)

The image processing system according to any one of Supplementary Notes 5 to 8, wherein the second detection means detects increase or decrease in number of persons in the partial area, and the output means informs separately about information indicating that persons are gradually gathering in a certain area, based on a result of detection of increase or decrease in the number of persons obtained by the second detection means.

(Supplementary Note 10)

An image processing method carried out by an image processing system, the image processing method including: a step of generating an background image based on input images captured at a plurality of times by an image-capture device; a step of detecting a continued-presence area in a partial area in which an image of a plurality of persons possibly exists in an input image, based on a difference between a first background image generated based on input images captured within a first time width from a processing time and a second background image generated based on input images captured within a second time width from the processing time; a step of detecting at least one person which exists in the partial area in the input image; and a step of detecting, based on a detection result of the continued-presence area and a person detection result, continued presence of the plurality of persons in the partial area.

(Supplementary Note 11)

The image processing method according to Supplementary Note 10, wherein the background image is generated based on a static area including no motion, in the input images (Supplementary Note 12)

The image processing method according to Supplementary Note 10 or 11, wherein a size of the partial area is set depending on a position of the image-capture device capturing input images and the partial area in the input image.

(Supplementary Note 13)

The image processing method according to any one of Supplementary Notes 10 to 12, wherein the detection result of the continued-presence area in a lower area of the partial area has a larger influence on the detection result of the continued-presence area of the plurality of persons than the detection result of the continued-presence area in an upper area of the partial area.

(Supplementary Note 14)

The image processing method according to any one of Supplementary Notes 10 to 13, further including a step of informing about the detection result of the continued presence of the plurality of persons in the partial area.

(Supplementary Note 15)

The image processing method according to Supplementary Note 14, wherein an informing method is changed according to degree of the continued presence of the plurality of persons.

(Supplementary Note 16)

The image processing method according to Supplementary Note 14, wherein the step of informing informs based on a time period in which a degree of the continued presence of the plurality of persons exceeds a threshold value.

(Supplementary Note 17)

The image processing method according to Supplementary Note 16, wherein the threshold value is user-settable.

(Supplementary Note 18)

The image processing method according to any one of Supplementary Notes 14 to 17, wherein an increase or a decrease in number of persons in the partial area is detected, and information indicating that persons are gradually gathering in a certain area is informed separately, based on a result of the detection of an increase or a decrease in the number of persons obtained by the second detection means.

(Supplementary Note 19)

A program for causing a computer to execute: a process of generating an background images based on input images captured at a plurality of times by an image-capture device; a process of detecting a continued-presence area in a partial area in which an image of a plurality of persons possibly exists in an input image, based on a difference between a first background image generated based on input images captured within a first time width from a processing time and a second background image generated based on input images captured within a second time width from the processing time; a process of detecting at least one person which exists in the partial area in the input image; and a process of detecting, based on a detection result of the continued-presence area and a person detection result, continued presence of the plurality of persons in the partial area.

(Supplementary Note 20)

The program according to Supplementary Note 19, wherein the background image is generated based on a static area including no motion, in the input images.

(Supplementary Note 21)

The program according to Supplementary Note 19 or 20, wherein a size of the partial area is set depending on a position of the image-capture device capturing input images and the partial area in the input image.

(Supplementary Note 22)

The program according to any one of Supplementary Notes 19 to 21, wherein he detection result of the continued-presence area in a lower area of the partial area has a larger influence on the detection result of the continued-presence area of the plurality of persons than the detection result of the continued-presence area in an upper area of the partial area.

(Supplementary Note 23)

The program according to any one of Supplementary Notes 19 to 22, causing the computer to further execute an output process for informing about the detection result of the continued presence of the plurality of persons in the partial area.

(Supplementary Note 24)

The program according to Supplementary Note 23, wherein an informing method is changed according to degree of the continued presence of the plurality of persons.

(Supplementary Note 25)

The program according to Supplementary Note 23, wherein the output process informs based on a time period in which a degree of the continued presence of the plurality of persons exceeds threshold value.

(Supplementary Note 26)

The program according to Supplementary Note 25, wherein the threshold value is user-settable.

(Supplementary Note 27)

The program according to any one of Supplementary Notes 23 to 26, wherein an increase or a decrease in number of people in the partial area is detected, and information indicating that persons are gradually gathering in a certain area is informed separately, based on a result of the detection of an increase or a decrease in the number of people obtained by the second detection means.

This application claims the priority based on Japanese Patent Application No. 2013-176082 filed on Aug. 27, 2013, the entire disclosure of which is incorporated herein.

REFERENCE SIGNS LIST

1 Image processing system
601 Image input unit
603 Foreground/background separation unit
605 Background-image generation unit
607 Background-image storage unit
609 Background-image comparison unit
611 Static-area determination unit
613 Continued-presence-score calculation unit
615 Database
617 Divided-area information
619 Factor information
621 Person detection unit
623 Complex-score calculation unit
625 Gathering-score calculation unit
627 Output unit
1001 Processor
1003 Memory
1005 Storage device
1007 Input interface
1009 Data interface
1011 Communication interface
1013 Display device
1100 Image processing device
1110 Generation unit
1120 First detection unit
1130 Second detection unit
1140 Third detection unit
P1, P2, P3, P4, P5 Person
W Detection window

The invention claimed is:

1. An image processing system comprising:
a memory storing instructions; and
a processor configured to execute the instructions to:
generate an background image based on input images captured at a plurality of times by an image-capture device;
detect a continued-presence area in a partial area in which an image of a plurality of persons possibly exists in an input image, based on a difference between a first background image generated based on input images captured within a first time width from a processing time and a second background image generated based on input images captured within a second time width from the processing time;
detect at least one person which exists in the partial area in the input image; and
detect, based on a detection result of the continued-presence area and a person detection result, continued presence of the plurality of persons in the partial area, wherein the detection result of the continued-presence detection area in a lower area of the partial area is given a larger influence on the detection result of the continued-presence area of the plurality of persons than the detection result of the continued-presence area in an upper area of the partial area.

2. The image processing system according to claim 1, wherein
the background image is generated based on a static area including no motion, in the input images.

3. The image processing system according to claim 1, wherein
a size of the partial area is set depending on a position of the image-capture device capturing input images and the partial area in the input image.

4. The image processing system according to claim 1, wherein the processor is further configured to execute the instructions to:
inform about the detection result of the continued presence of the plurality of persons in the partial area.

5. The image processing system according to claim 4, wherein the processor is further configured to execute the instructions to:
change an informing method depending on a degree of the continued presence of the plurality of persons.

6. The image processing system according to claim 4, wherein the processor is further configured to execute the instructions to:
inform based on a time period in which a degree of the continued presence of the plurality of persons exceeds a threshold value.

7. The image processing system according to claim 6, wherein
the threshold value is user-settable.

8. The image processing system according to claim 4, wherein the processor is further configured to execute the instructions to:
detect increase or decrease in number of persons in the partial area, and
inform separately about information indicating that persons are gradually gathering in a certain area, based on a result of detection of increase or decrease in the number of persons obtained by the second detector.

9. An image processing method-comprising:
generating an background image based on input images captured at a plurality of times by an image-capture device;
detecting a continued-presence area in a partial area in which an image of a plurality of persons possibly exists in an input image, based on a difference between a first background image generated based on input images captured within a first time width from a processing time and a second background image generated based on input images captured within a second time width from the processing time;
detecting at least one person which exists in the partial area in the input image; and
detecting, based on a detection result of the continued-presence area and a person detection result, continued presence of the plurality of persons in the partial area, wherein the detection result of the continued-presence detection area in a lower area of the partial area is (liven a larger influence on the detection result of the continued-presence area of the plurality of persons than the detection result of the continued-presence area in an upper area of the partial area.

10. A non-transitory computer readable recording medium which stores a program for causing a computer to execute:
a process of generating an background images based on input images captured at a plurality of times by an image-capture device;
a process of detecting a continued-presence area in a partial area in which an image of a plurality of persons possibly exists in an input image, based on a difference between a first background image generated based on input images captured within a first time width from a processing time and a second background image generated based on input images captured within a second time width from the processing time;
a process of detecting at least one person which exists in the partial area in the input image; and
a process of detecting, based on a detection result of the continued-presence area and a person detection result, continued presence of the plurality of persons in the partial area, wherein the detection result of the continued-presence detection area in a lower area of the partial area is (liven a larger influence on the detection result of the continued-presence area of the plurality of persons than the detection result of the continued-presence area in an upper area of the partial area.

* * * * *

UNITED STATES PATENT AND TRADEMARK OFFICE
CERTIFICATE OF CORRECTION

PATENT NO. : 9,934,576 B2  
APPLICATION NO. : 14/915109  
DATED : April 3, 2018  
INVENTOR(S) : Konishi Page 1 of 1

It is certified that error appears in the above-identified patent and that said Letters Patent is hereby corrected as shown below:

In the Claims

Claim 9, Column 18, Line 14, "(liven" should read as --given--.

Claim 10, Column 18, Line 39, "(liven" should read as --given--.

Signed and Sealed this  
Twelfth Day of June, 2018

Andrei Iancu  
*Director of the United States Patent and Trademark Office*